(12) United States Patent
Daniel

(10) Patent No.: US 8,606,679 B1
(45) Date of Patent: Dec. 10, 2013

(54) METHODS AND SYSTEMS FOR ONLINE REAL ESTATE TRANSACTIONS

(76) Inventor: Jonathan J. Daniel, Stamford, CT (US)

(*) Notice: Subject to any disclaimer, the term of this patent is extended or adjusted under 35 U.S.C. 154(b) by 944 days.

(21) Appl. No.: 12/538,789

(22) Filed: Aug. 10, 2009

Related U.S. Application Data

(60) Provisional application No. 61/087,410, filed on Aug. 8, 2008.

(51) Int. Cl.
*G06Q 40/00* (2012.01)

(52) U.S. Cl.
USPC .......................................... 705/36 R; 705/35

(58) Field of Classification Search
USPC ...................................................... 705/35–38
See application file for complete search history.

(56) References Cited

U.S. PATENT DOCUMENTS

| | | | | |
|---|---|---|---|---|
| 6,021,397 A | * | 2/2000 | Jones et al. ................ | 705/36 R |
| 2001/0042785 A1 | * | 11/2001 | Walker et al. ................ | 235/379 |
| 2002/0032626 A1 | * | 3/2002 | DeWolf et al. ................ | 705/35 |
| 2002/0046144 A1 | * | 4/2002 | Graff ................ | 705/36 |
| 2004/0117302 A1 | * | 6/2004 | Weichert et al. ................ | 705/40 |
| 2006/0190277 A1 | * | 8/2006 | Zimmerman et al. ........... | 705/1 |

* cited by examiner

*Primary Examiner* — Alexander Kalinowski
*Assistant Examiner* — Kellie Campbell
(74) *Attorney, Agent, or Firm* — Cowan, Liebowitz & Latman, P.C.; Steven D. Underwood

(57) ABSTRACT

The disclosed technology provides systems and methods for processing, auctioning, and managing fractional ownerships in real estate assets. In one aspect, the disclosed technology accesses electronic information that specifies a real estate asset for sale. The electronic information specifies that ownership of the real estate asset includes a right to some or all income from the real estate asset. The disclosed technology also accesses electronic information that specifies one or more of bids for fractional ownership in the real estate asset. Each of the bids specifies a bid amount reflecting a purchase price to be paid for the fractional ownership and a corresponding bid yield associated with the bid amount. The disclosed technology selects one or more of the bids to form a sale transaction for the real estate asset and then stores an electronic record indicating that a fractional ownership in the real estate asset has been sold based on the selected bid(s).

16 Claims, 12 Drawing Sheets

| BIDDER ID AABBCC22 | | | | | | | ACCOUNT SUMMARY | | |
|---|---|---|---|---|---|---|---|---|---|
| | | | | | | | Q & A | | |
| Bidder Name: | John Doe | | | | | | Deposit Account | | |
| | | | | | | | Discussion Board | | |
| Current Bids | | | | | | | | | |
| Auction ID (w link) | Bid Status | Bid Amount | Bid Yield | Status Amount | Auction Deadline | Est Net Yield % | EDIT BID | | |
| Aaa111 | Y | $10,000 | 8% | $10,000 | 7/21/2005 | 7.82% | Change or Edit Bid | | |
| Aaa222 | N | $25,000 | 9% | $0 | 7/24/2005 | 8.84% | Change or Edit Bid | | |
| Bbb333 | P | $15,000 | 11% | $10,000 | 7/29/2005 | 10.92% | Change or Edit Bid | | |
| Ccc444 | Y | $10,000 | 12% | $10,000 | 7/29/2005 | 11.86% | Change or Edit Bid | | |
| Totals | | $60,000 | | $30,000 | | | | | |
| | | | | | | | | | |
| REAFS Owned | | | | | | | | | |
| Property | | Value | Yield | Monthly Income | | | | | |
| 111 Main St, Albany NY 11111 | | $15,000 | 10.00% | $125 | For tax statements click here | | | | |
| 2 Washton Blvd, Staforn, NJ 22222 | | $10,000 | 9.88% | $82.33 | For tax statements click here | | | | |
| Totals | | $25,000 | 9.95% | $207.33 | | | | | |
| | | | | | | | | | |
| REAFS Borrowing Availability | | $12,500 | | | | | | | |
| Cash in Account | | $50,000 | | | | | | | |
| Total Available to Bid | | $62,500 | | | | | | | |
| | | | | | | | | | |
| SELL MY REAFS | | | | | | | | | |

PROPERTY PICTURE (WITH LINK TO MORE PICS)

| | |
|---|---|
| AUCTION ID | ######### |
| AUCTION DEADLINE | 12/31/2006 |
| ASSET TYPE | FEE SIMPLE SINGLE TENANT INVESTMENT PROPERTY |
| PROPERTY TYPE | RETAIL |
| OBLIGOR NAME | LESSEE - ABCCBA COMPANY |
| OBLIGOR CREDIT RATING | AA- (CLICK HERE FOR DESCRIPTION) |
| PROPERTY ADDRESS | 222 MAIN STREET, STAMFORD, CT 22222 |
| MARKET TIER | A OR # (CLICK HERE FOR DESCRIPTION) |
| PROPERTY DESCRIPTION | FREESTANDING RETAIL BUILDING – CORNER LOCATION SITUATED ON 1.38 ACRES |
| BUILDING SIZE | 10,000 SF |
| YEAR BUILT | 1972 |
| FLOOD ZONE | NO |
| ASKING PRICE | $1,000,000 [BUY NOW PRICE $1,000,000] |
| ASKING PRICE PER SF | $100 |
| MINIMUM BID | $10,000  [REAFS BUY NOW MINIMUM BID $25,000] |
| ASKING YIELD | 10%  [REAFS BUY NOW MAXIMUM YIELD BID 10%] |
| MAXIMUM BID YIELD | 11.75% |
| % OF PROPERTY FOR SALE | 100% [SELLER MAY RETAIN UP TO 20% IF SELLER RETENTION YIELD IS MET] |
| GROSS INCOME | $100,000 / $10 PER SF |
| NET INCOME | $100,000 / $10 PER SF |
| OTHER INCOME | NA (eg MTG INCOME, OPTION INCOME, ETC) |
| INTERNAL RATING | AA12 (CLICK HERE FOR DESCRIPTION |

FIG. 2

DUE DILIGENCE LINKS

PICTURES

ENVIRONMENTAL REPORT

LEASE(S)

MORTGAGE/LOAN DOCS

SURVEY

INSURANCE

PROPERTY CONDITION REPORT (WHEN APPLICABLE)

MAPS

TITLE INSURANCE

APPRAISAL (WHEN APPLICABLE)

DEMOGRAPHICS

TRAFFIC COUNTS

OBLIGOR FINANCIALS AND INFO

PROPERTY FIELD CARDS

INTERNAL RATINGS DESCRIPTION

FIG. 3

Asset Type *[can select multiple]*

[--All Types--]
commercial real estate
mortgages
options
loans
liens (tax, municipals, etc.)

Property Type *[greyed out if N/A]*

[--All Types--]
Residential
Retail
Office
Industrial
Multifamily
Land
Other

Building Size (SF) *[greyed out if N/A]* min
max

Lot Size (Acres) *[greyed out if N/A]* min
max

Year Built *[greyed out if N/A]*

[  ] to [  ]

Location

State

[drop-down lists states]

City         Zip Code

Search Range

10 miles
25 miles
50 miles
100 miles

*OR*

County

[drop-down lists counties in selected states]

Asking Price min $
max $

Asking Yield min %
max %

% of Property Offered

[--no selection--]
1 - 25%
26 - 50%
51 - 75%
76 - 100%

Internal Rating

[--no selection--]
A
B
C
D

FIG. 4

| Auction ID | Asset Type | Property Address | City | State | Property Type | Square Footage | Year Built | Gross Asking Price | Minimum Bid | Asking Yield | % Property Offered | Obligor Name | Internal Rating | Auction Deadline |
|---|---|---|---|---|---|---|---|---|---|---|---|---|---|---|
| Aaa111 | comm real estate | 111 Main St | Albany | NY | multifamily | 3,200 | 1953 | $15,000 | $7,500 | 10.00% | 50% | Acme Co. | B | 2 days, 4 hrs, 30 min |
| Aaa222 | comm real estate | 222 Washington Blvd | Stafor | NJ | industrial | 20,000 | 1994 | $10,000 | $9,000 | 9.88% | 95% | John Smith | A | 8 days, 0 hrs, 15 min |
| Aaa333 | mortgage | 331 Main St | Stamford | CT | industrial | 10,000 | 1978 | $25,000 | $20,000 | 12.00% | 100% | XYZ LLC | A | 3 days, 0 hrs, 15 min |
| Aaa444 | comm real estate | 500 Elm St | Stamford | CT | retail | 6,500 | 1990 | $12,500 | $10,000 | 11.00% | 100% | Jane Doe | D | 10 days, 2 hrs, 30 min |

FIG. 5

| PROPERTY LISTING #JJJ222 | | |
|---|---|---|
| TENANT: | SILO CORP. | LINKS |
| ADDRESS: | 222 MAIN STREET, STAMFORD, CT 22222 | Discussion Board |
| BUILDING TYPE: | RETAIL | Property Detail |
| BUILDING SIZE: | 10,000 SF | Maps |
| LEASE DURATION: | 15 YEARS + OPTIONS | Tenant Info |
| INCOME: | $100,000 NNN PER ANNUM | Q & A |
| ASKING PRICE: | $1,000,000 | Due Diligence |
| ASKING YIELD: | 10.000% | |
| MIN BID AMOUNT: | $10,000 | |
| AUCTION DURATION: | 12 days and 4 hours | |
| MMSC FEE: | 0.250% | Bid Status: Y=Yes / N=No / P=Part |

| FRACTIONAL BID – REAFS | | WHOLE BID | |
|---|---|---|---|
| CURRENT AVERAGE YIELD = | 9.980% | BUY 100% YIELD OFFER = 11% | |

| FRACTIONAL BUY NOW - REAFS | | WHOLE BUY NOW BID | |
|---|---|---|---|
| CURRENT AVERAGE YIELD = | 0.000% | BUY 100% YIELD OFFER = 11% | |

| BIDDER ID HISTORY | BID AMOUNT | BID YIELD | BID STATUS | SUCCESS AMT. | % OF OWNERSHIP | RECENT BID DATE |
|---|---|---|---|---|---|---|
| AAA1 | $25,000 | 10.000% | Y | $25,000 | 2.500% | 7/12/2000 |
| AAA2 | $100,000 | 11.000% | Y | $100,000 | 10.000% | 7/12/2000 |
| AAA3 | $200,000 | 11.250% | P | $48,661 | 20.000% | 7/12/2000 |
| AAA4 | $10,000 | 9.000% | Y | $10,000 | 1.000% | 7/12/2000 |
| AAA5 | $25,000 | 9.250% | Y | $25,000 | 2.500% | 7/12/2000 |
| AAA6 | $150,000 | 9.500% | Y | $150,000 | 15.000% | 7/12/2000 |
| AAA7 | $15,000 | 9.500% | Y | $15,000 | 1.500% | 7/12/2000 |
| AAA8 | $50,000 | 9.500% | Y | $50,000 | 5.000% | 7/12/2000 |
| AAA9 | $25,000 | 9.500% | Y | $25,000 | 2.500% | 7/12/2000 |
| AAA10 | $15,000 | 10.250% | Y | $15,000 | 1.500% | 7/12/2000 |
| AAA11 | $17,500 | 9.650% | Y | $17,500 | 1.750% | 7/12/2000 |
| AAA12 | $22,500 | 9.750% | Y | $22,500 | 2.250% | 7/12/2000 |
| AAA13 | $300,000 | 10.500% | Y | $300,000 | 30.000% | 7/12/2000 |
| AAA14 | $75,000 | 10.000% | Y | $75,000 | 7.500% | 7/12/2000 |
| AAA15 | $25,000 | 10.250% | Y | $25,000 | 2.500% | 7/12/2000 |
| AAA16 | $15,000 | 10.000% | Y | $15,000 | 1.500% | 7/12/2000 |
| AAA17 | $12,500 | 10.000% | Y | $12,500 | 1.250% | 7/12/2000 |
| AAA18 | $10,000 | 10.250% | Y | $10,000 | 1.000% | 7/12/2000 |
| AAA19 | $25,000 | 10.375% | Y | $25,000 | 2.500% | 7/12/2000 |
| AAA20 | $15,000 | 9.750% | Y | $15,000 | 1.500% | 7/12/2000 |
| AAA21 | $50,000 | 11.500% | N | $0 | 5.000% | 7/12/2000 |
| AAA22 | $10,000 | 11.500% | N | $0 | 1.000% | 7/12/2000 |
| Total Bids | $1,192,500 | | | $981,161 | | |
| WAY | 9.980% | | | | | |

FIG. 6

| | | | |
|---|---|---|---|
| BIDDER ID AABBCC22 ($xxx,xxx currently available for bidding) | | | BID SUMMARY |
| Bidder Name: | JOHN DOE | | LINKS |
| Auction Listing: | ID # (with hyperlink to auction listing) | | Q & A |
| Auction Item Address: | 222 MAIN STREET, STAMFORD, CT 22222 | | Deposit Account |
| Auction Asset Type: | RETAIL | | Discussion Board |
| BID AMOUNT: | [ENTER $ HERE] | *min bid $10,000* | |
| BID YIELD: | [ENTER % HERE] | *maximum yield 11%* | |
| Less MMSC Fee: | ($25) | *(-0.025%)* | |
| Less Est. REAFS OPX Fee: | ($50) | | |
| Estimated NET RETURN: | $1,025 | | BID NOW |
| Estimated Bidder NET YIELD: | 10.250% | | 12 days and 4 hours left |
| Quarterly/Monthly Income: | $xxx,xxx | | |
| | | | X REAFS BUY NOW |
| | | | _ WHOLE BUY NOW |

FIG. 7

| BIDDER ID AABBCC22 | | | | | ACCOUNT SUMMARY | | |
|---|---|---|---|---|---|---|---|
| | | | | | *Q & A* | | |
| Bidder Name: | John Doe | | | | *Deposit Account* | | |
| | | | | | *Discussion Board* | | |
| Current Bids | | | | | | | |
| Auction ID (w link) | Bid Status | Bid Amount | Bid Yield | Status Amount | Auction Deadline | Est Net Yield % | EDIT BID |
| Aaa111 | Y | $10,000 | 8% | $10,000 | 7/21/2005 | 7.82% | Change or Edit Bid |
| Aaa222 | N | $25,000 | 9% | $0 | 7/24/2005 | 8.84% | Change or Edit Bid |
| Bbb333 | P | $15,000 | 11% | $10,000 | 7/29/2005 | 10.92% | Change or Edit Bid |
| Ccc444 | Y | $10,000 | 12% | $10,000 | 7/29/2005 | 11.86% | Change or Edit Bid |
| Totals | | $60,000 | | $30,000 | | | |

| REAFS Owned | | | | |
|---|---|---|---|---|
| Property | Value | Yield | Monthly Income | |
| 111 Main St, Albany NY 11111 | $15,000 | 10.00% | $125 | For tax statements click here |
| 2 Washton Blvd, Staforn, NJ 22222 | $10,000 | 9.88% | $82.33 | For tax statements click here |
| Totals | $25,000 | 9.95% | $207.33 | |

| | |
|---|---|
| REAFS Borrowing Availability | $12,500 |
| Cash in Account | $50,000 |
| Total Available to Bid | $62,500 |

SELL MY REAFS

FIG. 8

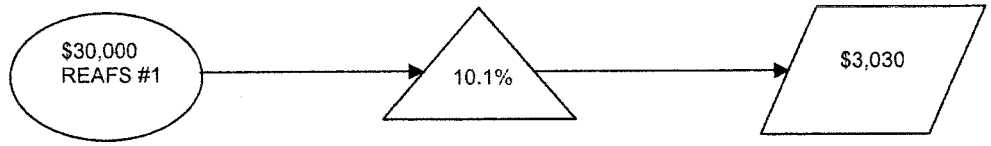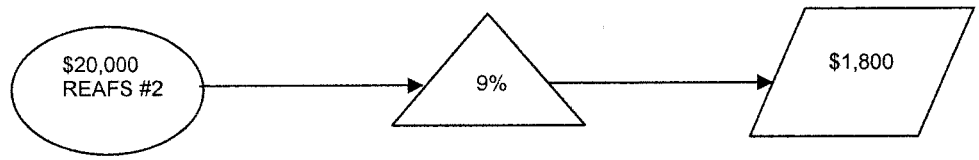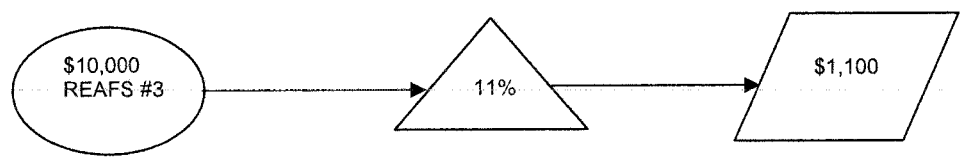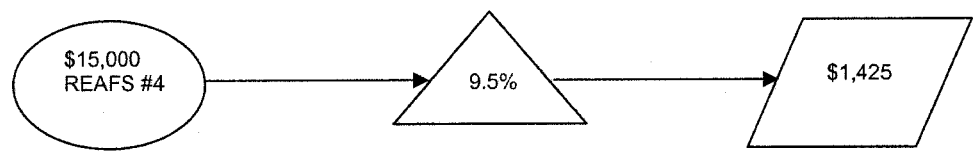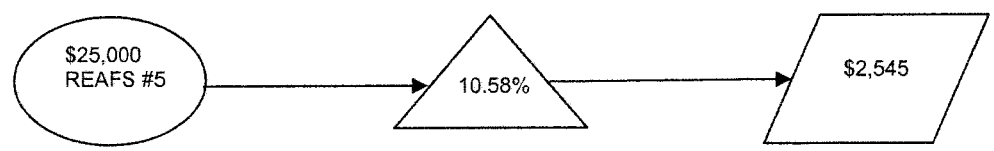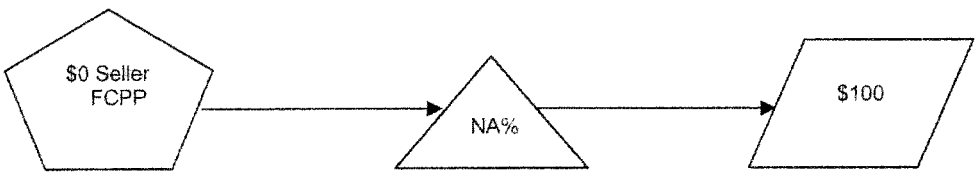
FIG. 9

BPA = bid purchase amount
Total BPA = Collective REAFS bid purchase amount
REAFS = real estate asset fractional securities
WAY = weighted average yield
WBPA = single whole bid purchase amount
FCPP = future cash flow payment premium

METHODS AND SYSTEMS FOR ONLINE REAL ESTATE TRANSACTIONS

CROSS-REFERENCE TO RELATED APPLICATIONS

This applications claims priority to U.S. Provisional Application No. 61/087,410, filed Aug. 8, 2008, the entire contents of which are hereby incorporated herein by reference.

FIELD OF THE INVENTION

The present invention relates to the field of information processing and management, and more particularly, to methods and systems for processing and managing fractional ownerships in real estate assets.

BACKGROUND

Real estate assets make up a large portion of the domestic and global economy and traditionally have been exploited arenas of investment by banks, institutions, corporations, REITS, pensions, endowments and private investors. However, private investors have long had a need for a low cost, direct, efficient method for bidding on and/or investing in real estate assets ("RE asset(s)" or "asset(s)").

Private real estate partnerships have historically been a primary avenue for fractional direct investment in RE assets; however, such partnerships typically involve excessive general partner fees and require limited partners to relinquish part of the future upside associated with their investment in the RE asset. Public entities or real estate investment trusts (REITs) are available liquid vehicles to acquire and hold RE assets for individual investors; however, they are subject to (a) the volatility of the stock market, (b) dilution from stock options and secondary offerings, and (c) decision-making that often benefits the near-term stock price of the company rather than the long term interests of stockholders.

Private investors who have the financial wherewithal and real estate knowledge to acquire a RE asset directly have a unique opportunity to compete against larger institutions, REITS, banks and professionals. However, investors in today's fast paced investment marketplace have virtually no options available to directly invest in RE assets by acquiring fractional interests that may be offered in smaller ownership balances than typical, in a low cost and efficient manner.

Accordingly, there is an immediate need to provide an apparatus and methodology enabling investors, via an automated exchange and utilizing the internet, to acquire fractional interests and/or "micro ownership" interests in RE assets in a low cost, efficient environment by bidding directly for such ownership interests in RE assets, by way of novel securities that will be referred to herein as "real estate asset fractional securities" ("REAFS") and/or by way of whole real estate assets. As described herein, REAFS ownership may also be referred to using alternate terminology, such as real estate fractional securities (REFS), real estate asset micro securities (REAMS), micro real estate ownership securities, micro property securities, micro real estate securities, micro real estate, micro mortgages, or real estate partnership securities.

SUMMARY

The disclosed technology provides systems and methods for processing, auctioning, and managing fractional ownerships in RE assets. In one aspect, the disclosed technology accesses electronic information that specifies a real estate asset for sale. The electronic information specifies that ownership of the real estate asset includes a right to some or all income from the real estate asset. The disclosed technology also accesses electronic information that specifies one or more bids for fractional ownership in the real estate asset. Each of the bids specifies a bid amount reflecting a purchase price to be paid for the fractional ownership and a corresponding bid yield associated with the bid amount. The disclosed technology selects one or more of the bids to form a sale transaction for the real estate asset and then stores an electronic record indicating that a fractional ownership in the real estate asset has been sold based on the selected bid(s).

Other features and advantages of the disclosed technology will become more apparent when considered in connection with the accompany drawings and detailed description.

BRIEF DESCRIPTION OF THE DRAWINGS

In the drawings:

FIG. 2 depicts an exemplary property detail page in accordance with one aspect of the disclosed technology;

FIG. 3 depicts an exemplary due diligence page in accordance with one aspect of the disclosed technology;

FIG. 4 depicts an exemplary search page for locating real estate assets;

FIG. 5 depicts an exemplary search listing results page resulting from use of a search page;

FIG. 6 depicts an exemplary auction bid listing screen for a real estate asset;

FIG. 7 depicts an exemplary bid page presented to a bidder who wishes to bid on a real estate asset; and FIG. 8 depicts an exemplary account summary page for a bidder using the disclosed exchange system;

FIG. 9 illustrates an exemplary computation of a weighted average yield in accordance with one aspect of the disclosed technology;

DETAILED DESCRIPTION

Figure 1:
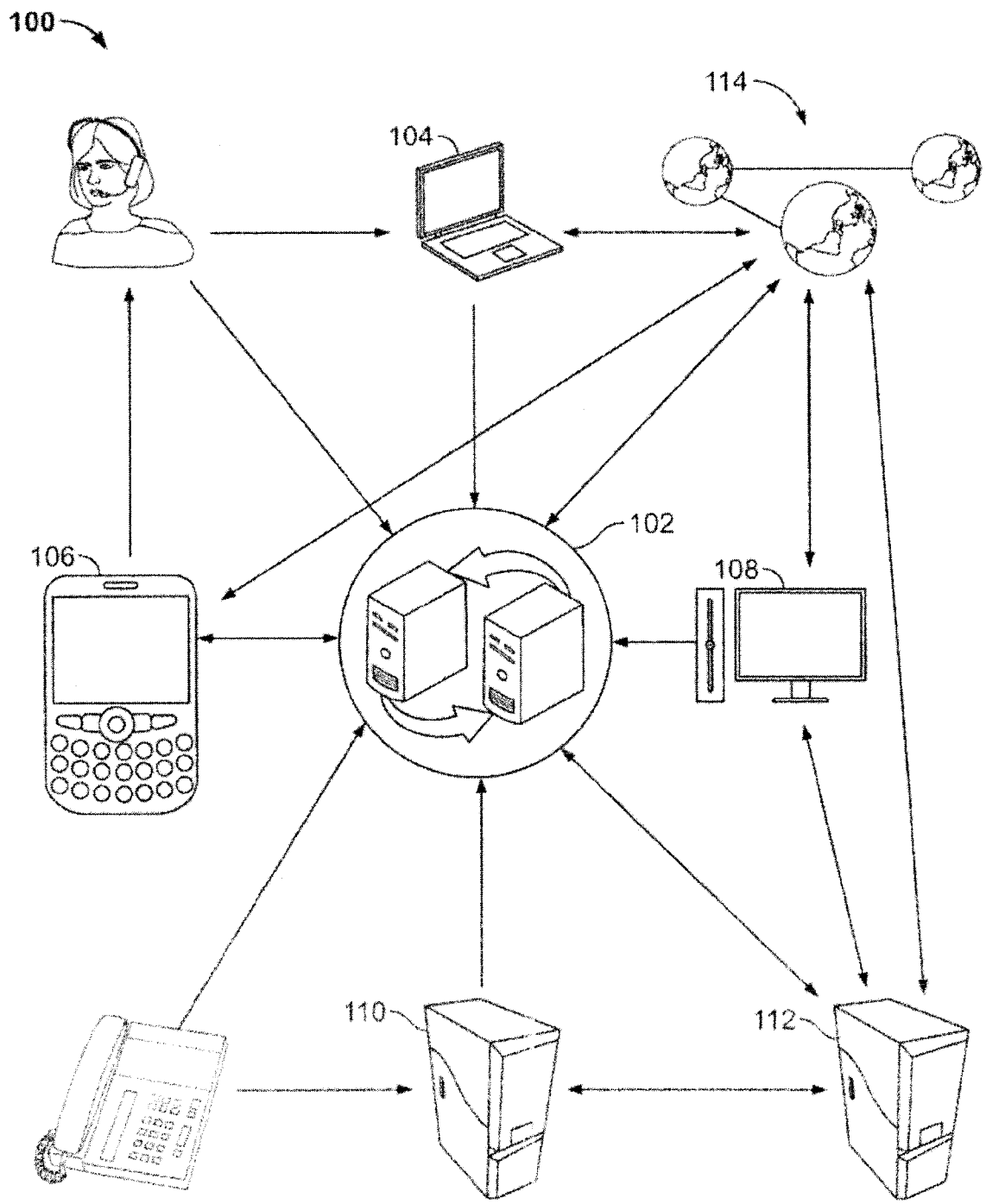
FIG. 1 depicts an exemplary computer system and network for implementation of the disclosed technology.

The disclosed technology provides systems and methods for processing and managing fractional ownerships in real estate assets.

As used herein, "real estate asset" refers to any real property, any interest in real property, and any derivatives thereof, and includes, but is not limited to, commercial properties, residential properties, leaseholds, mortgages, mezzanine loans, sale leasebacks, single tenant or multi-tenant "triple net" properties (also known as "NNN" properties), any investment property with or without cash flow, remainder interests, estate for years, options, tax liens, municipal liens, maintenance liens, mezzanine loans, preferred equity, real estate brokerage receivables, and REAFS loans (which will be described in more detail herein), and derivatives of the aforementioned.

One skilled in the art will understand that NNN or triple net refers to a lease in which the lessee pays rent to the lessor, as well as all taxes, insurance, and maintenance expenses that arise from the use of the property. A NNN leased property is an investment property which is typically bound to a long term lease with a single tenant occupant. Rents may increase periodically and lease terms are usually 10-20 years from lease inception. The tenant pays all expenses associated with operating the property, including insurance, real estate taxes, maintenance, and repairs, thereby greatly reducing the owner's exposure to rising property expenses. Furthermore, the owner enjoys rental income "net" of expenses so cash flow is highly predictable during the lease term. Tenants in NNN property investments are typically credit worthy, national or regional based companies that occupy and conduct business from the subject location. The number of tenants and the length of the lease can vary, but typically there is only a single tenant. NNN properties can include bank branches, pharmacies, fast food restaurants, retailers, supermarkets, convenience stores, restaurants, package delivery company facilities, and office buildings.

One aspect of the disclosed technology provides securities that include fractional ownership interests in real estate assets. As mentioned above, these securities will be referred to herein preferably as "real estate asset fractional securities" (REAFS), but they may also be referred to as real estate fractional security (REFS) or real estate asset micro security (REAMS). In various embodiments, the fractional ownership may be an undivided interest, a divided interest, or a combination thereof in a tenancy in common or other method of ownership structure whereby the RE asset will be held personally or in an entity by corporation, trust, limited liability partnership, limited partnership, limited liability company, or any other entity, or combination thereof, which may be used for the acquisition of RE assets.

One aspect of the disclosed technology is directed to using online auctioning systems and methods (in conjunction with traditional methods) in creating real estate asset fractional securities (REAFS) or real estate asset micro securities (REAMS) by dividing and/or fractionalizing real estate asset transactions and affording investors on a global basis the ability to bid for the micro/fractional securities and/or whole real estate assets, thus creating a fully integrated real estate micro auction market and exchange. In this way, REAFS can offer investors access to leveraged or unleveraged, direct fractional ownership in high quality NNN properties or other real estate assets at a very low-cost entry. This will: (a) enable investors to acquire REAFS or REAMS and whole RE assets in a direct, low cost and efficient environment; and (b) provide sellers with a more expeditious, efficient, and potentially higher-yielding disposition method to handle the sale of RE assets in a direct, competitive, and effective environment.

Referring to FIG. 1, in accordance with one aspect of the disclosed technology, there is shown a fully integrated online RE asset transaction exchange architecture 100. The illustrated architecture 100 includes an exchange system 102 that is in communication with seller and/or bidder computers 104, 106, 108 through a computer network. The exchange system 102 may also be in communication with various servers 110, 112 that contain information used by the exchange system 102, such as regulatory or license information, for example. The exchange system 102 can also be in communication with other computer networks 114. In various embodiments, a computer network can include different numbers of telecommunication devices and connections and can span a range of different geographies. In different embodiments, a computer network can include, among other things, all or portions of a wired telephone infrastructure, a cellular telephone infrastructure, a cable television infrastructure, and/or a satellite television infrastructure. As used herein, the term "computer" includes any system or device that can execute machine instructions, including, for example, desktops, laptops, servers, handheld devices, television set top boxes, and/or networked computing systems, or multiples or combinations thereof. A computer can include hardware such as network communication devices, storage medium/devices, processors, memory, computer boards, optical or magnetic drives, and/or human interface devices, and software such as operating system software, Web server software, Web browsing software, database management software, software supporting various communication protocols, and/or software supporting various programming languages.

The exchange system and method of the disclosed technology provides a unique and efficient marketplace for the acquisition and disposition of RE assets, primarily on a fractional securities ownership basis, but also on a whole asset basis. The system will provide the ability to market specific RE assets and allow potential buyers to bid on fractional securities in the RE asset via an auction method. Bidders may bid for REAFS via the disclosed auction methodology, known methodologies, or combinations thereof, including, in various embodiments: (i) an English auction, (ii) sealed first price auction, (iii) buyout auction, (iv) reserve auction, (iv) no-reserve auction, (v) silent auction, (vi) sealed bid auction (vii) Dutch auction, and/or (viii) a buy now price to take RE asset off the market (including whole buy now and factional ownership buy now). As used herein, a traditional/"uncapped" auction will refer to an auction in which a seller lists a real estate asset's asking price and bidders can submit bid amounts below, equal to, or greater than the asking price. In contrast, a "capped" auction will refer to an auction in which a seller lists a real estate asset's asking price and any bidder can only submit bid amounts below or equal to the asking price, and sellers can achieve only up to the asking price; any bidder(s) cannot enter bid amounts greater than the asking price. Unless stated otherwise, aspects and embodiments of the technology described herein apply to both capped auctions and uncapped auctions.

In various embodiments, the disclosed technology may include the requirement of either (i) a Realtor Brokers License in the State(s) of property offerings, (ii) a registered Broker Dealer license, or (iii) both in connection with the sale or offering of RE assets and/or securities. The exchange may obtain or be required to obtain a real estate broker license(s) and/or other applicable real estate licenses or regulatory requirements (together "RE licenses") or make affiliations with persons with RE licenses for compliance purposes in connection with the handling of leasing, acquisitions and dispositions of RE assets. Additionally, the exchange may obtain or be required to obtain a broker dealer license and meet other applicable regulatory requirements ("Broker Dealer") or make affiliations with other Broker Dealers for compliance purposes in the handling of the sales of securities. Lastly, the exchange may elect or be required to register and operate as an exchange with the United States Securities Exchange Commission and/or other applicable governing authorities.

There preferably is a Master Manager Servicing and Custodian Agreement ("MMSC Agreement"), which may be an individual agreement, or part of the operating agreement or both. The MMSC Agreement preferably shall give the exchange or an affiliate thereof authority to handle all aspects of managing the properties, leasing the properties, collecting rents and/or other cash flows, distribute cash flow to REAFS, hold all RE asset documentation, authorize accounting on behalf of REAFS, handle tax reporting, handle brokerage assignments on behalf of REAFS, have powers of attorney to perform all ownership functions and generally be responsible for treating all REAFS in an equitable way regardless of ownership interest or yield in RE assets. The MMSC preferably will be a low cost alternative manager for RE assets.

The system and MMSC preferably will retain ownership and beneficiary information to help assist trustees deal with assets when REAFS are passed through to estates. In at least one embodiment, the disclosed technology enables trustees of trusts and executors of estates to more efficiently dispose of real estate assets. It also provides a benefit to trustees and executors by providing a record keeping service with respect to real estate assets in which they invest as a buyer. These benefits are not available through other means. To this end, a system of one embodiment of the present invention maintains a database and/or accesses a database maintained by a third party or third parties that stores: (i) properties listed for sale, including all applicable ancillary, supporting and customary due diligence information relevant; and (ii) potential registered investors and bidders.

In one embodiment, sellers (real estate brokers and other consultants and professionals involved in the disposition of RE assets) can list RE assets for sale on the exchange or apparatus. Listing fees, brokerage fees, co-brokerage fees, bidder fees, processing fees, registration fees, bidder or buyer premium fees, and/or other fees may or may not be charged in connection with successful and unsuccessful listed RE asset transactions. Sellers may be required to complete a seller qualification and RE asset sale qualification and/or registration (hereinafter "asset sale registration"). Examples of information about a RE asset that a seller may provide are shown in FIG. 2 and FIG. 3.

Referring to FIG. 2, in many cases (using a single tenant property sale example), the lessee or tenant occupying the subject RE asset may have corporate securities trading in the public markets and therefore may have credit ratings associated with them. Other cases might involve a lessee(s) with a single leased location or a regional lessee(s) with multiple locations, who would probably not have publicly traded security instruments or ratings; however, information may be provided displaying lessee's, obligor's, borrower's and/or mortgagor's financial picture and/or wherewithal to make lease or other obligatory payments.

Referring to both FIG. 2 and FIG. 3, the RE asset sale registration module may require the seller to provide all of the relevant information, details and supporting documentation necessary for a bidder to adequately perform customary due diligence in connection with the RE asset. Such information may include: asking price, asking yield, percentage of property offered, auction duration or bid offer deadline/final bid offer time and date, buy now or offer now price, environmental reports, leases, title reports, surveys, property insurance, lessee insurance, lessee background and overview, lessee financials, lessee public ratings, flood information, appraisal, property condition report, maps, pictures, site plans, market tier, traffic counts, location demographics, square footage, property type, age, property description, sales per square feet, gross income, net income, gross and net income per square foot, property field cards, lien information and documentation, and/or mortgage or other debt information. In various embodiments, the seller can monitor varying ways to remain a partial owner in the RE asset being sold by entering parameters such as up to what portion of the asking price it would consider keeping and what minimum yields it requires.

An embodiment of the invention further provides a customized internal rating system built on variables including: market tier, lessee credit, lessee financials, demographics, location, sales per SF, site popularity, location popularity, site demand, income per square foot versus market, loan to value (for debt), debt service coverage (for debt), and loan per square foot (for debt).

The system preferably is operable to take the above information and produce marketing brochures and due diligence packages for prospective bidders that may be accessed via the online exchange and/or via email, fax, overnight delivery, or U.S. postal service. Snapshot or brief overviews may be available to non-registered bidders and sellers. These packages and overviews may be formatted as shown in FIG. 2 and FIG. 3. In one embodiment of the disclosed technology, a portion of the exchange system may be private labeled for outside real estate promoters and professionals who would like to use the system to market and monitor private placement and public RE asset offerings.

In an embodiment of the disclosed technology, potential purchasers and/or bidders of REAFS (hereinafter "bidders", "purchasers", "buyers" or "investors") are required to complete a customized online investor qualification module which will enable bidders to either (a) complete the qualification online or (b) print out the qualification package and complete it and return it via email, regular mail, facsimile, or other communication method. The investor qualification will qualify bidders in accordance with the laws of the governing jurisdiction that is applicable in connection with the offering of the subject RE asset and/or REAFS. In various embodiments, qualified bidder will receive a unique Bidder ID and login.

In one embodiment, registered bidders may set up their profile or seat on the exchange/website governing the offering. Bidders may search the inventory of assets by searchable criteria including, but not limited to: RE asset type, location, size, asset demographics, lessee credit, lessee(s), borrower(s) current bid asking yield, customized rating, group links set up by other members, loan to value (for debt), debt service coverage (for debt), buy now opportunities and bid per square foot.

Bidders may be required to have sufficient funds on deposit with the exchange or an exchange affiliate. Another approved arrangement that will back and/or guaranty full or partial payment in connection with a successful bid at the conclusion of the auction in an expeditious manner also may be used. When bidding, the bidder will typically: (a) have access to its balance on account and/or available to utilize for bidding; (b) enter the amount of money bidder would like to bid for the interest in the RE asset for sale (hereinafter "bid purchase amount(s)", "bid amount(s)" or "BPA"); and (c) enter the bid yield required in connection with its BPA (the "bid yield", "bid yield amount", or "BYA"). As used herein, bid yield or BYA is the bidder's proposed ownership interest in the cash flow associated with the real estate asset or, in other words, the yield that a bidder has bid or elected to receive in connection with its bid amount or fractional ownership.

In various embodiments, bidders may be required to deposit the entire bid purchase amount, a reasonable non refundable deposit amount, other applicable security, line of credit, or other acceptable form of guarantee/method of payment prior to bidding. In various embodiments, bidders may be required to deposit the entire bid purchase amount or a reasonable amount thereof prior to bidding for a REAFS or REFS.

In one embodiment, bidders may login, via the exchange website, and view a display of all of their current bids from an active bids screen which additionally may display which bids are active and which bids have been outbid and/or may display all REAFS which bidder currently owns. If a bid has been outbid and/or removed as an active bid from an auction, then the bidder may receive an email or other notification of the current, updated status of their bid. All bidders may receive notification at certain intervals, which may or may not be requested, prior to the bid deadline.

What have been described thus far are aspects of the disclosed fractional/micro securities and systems and methods for processing information related such securities. Also described are information related to the enrollment of sellers and buyers of such securities. Aspects of the disclosed technology directed to the auctioning of REAFS will now be described.

In a typical scenario of a user utilizing a network-based embodiment of the disclosed technology, the following steps occur:

(1) The user accesses a search page (see FIG. 4) and may enter parameters of interest or search all.
(2) The system searches its database(s) and presents a search listing results page (see FIG. 5).
(3) The user selects one of the listings shown on the search listings page, and is presented with a page showing a real estate asset bid listing screen (see FIG. 6).
(4) If the user wishes to obtain more detailed information regarding the selected property, he may click other links on the bid listing screen—for example, a link to a screen that may present additional property detail (see FIG. 2) or a link to a screen that may provide additional due diligence information (see FIG. 3).
(5) If the user viewing a real estate asset bid listing screen decides to bid on the property, he clicks on a link (e.g., in FIG. 6, "FRACTIONAL BID—REAFS") that corresponds to the type of bid desired.
(6) The user is then presented with a bid page (see FIG. 7) that displays the user's name and other information, and allows the user, in this example, to enter a bid amount and a bid yield, and to place a bid.
(7) At any time, a user may access its bidder account summary screen (see FIG. 8), which displays the user's current bids and property interests.

Various terminology used below will now be defined.

Real estate asset—Any real property, any interest in real property, and any derivatives thereof, and includes, but is not limited to, commercial properties, residential properties, leaseholds, mortgages, mezzanine loans, sale leasebacks, single tenant or multi-tenant "triple net" properties (also known as "NNN" properties), any investment property with or without cash flow, remainder interests, estate for years, options, tax liens, municipal liens, maintenance liens, mezzanine loans, preferred equity, real estate brokerage receivables, and REAFS loans (which will be described in more detail herein), and derivatives of the aforementioned.

Real estate asset fractional security ("REAFS")—A security that provides fractional ownership interest in a RE asset.

"Weighted average yield" ("WAY"), also referred to herein as current weighted average coupon ("WAC") or current weighted average cap rate ("WACR")—When combining multiple bids having the same or different bid amounts and bid yields, the aggregate bid amount for the combination is the sum of the individual bid amounts, and the bid yield for the combination is referred to herein as the "weighted average yield."

Whole buy now offer—A bidder option which, if accepted by the seller, will immediately end the auction, The winning bidder is required to purchase the RE asset subject to the terms of the whole buy now offer.

REAFS buy now offer—A bidder option which, if exercised, will reduce the availability of remaining REAFS or interests in the subject RE asset for sale throughout the remaining duration of the auction. The winning bidder is required to purchase the REAFS and the seller is required to sell the REAFS subject to the terms of the REAFS buy now offer.

As described above, buyers are able to bid on fractional ownership interests in RE assets based on certain minimum dollar amount increments on an auction sale by auction sale basis, and yield increments typically not to be less than one basis point, but in some cases greater than one basis point. A seller or broker may agree to list/sell a RE asset subject to certain asking prices and or yields. Registered and accepted potential buyers can search out, review and analyze assets for sale by many different criteria (as will be apparent to those skilled in the art) and make offers/bids to acquire all or a certain percentage of the asset based on criteria including, for example, the dollar amount/percentage of the asset they want to buy and the yield requirement they require in connection with their fraction.

In various embodiments, the bidders may bid using a bid purchase amount ("BPA"), at times subject to a minimum bid amount and other times not, and may bid using a bid yield, at times subject to a maximum yield and other times not. In a capped auction, this method of auctioning is unique from the perspective that the bid amounts may be capped, that is, may not exceed the capped ask price.

In various embodiments, the method, software, and system will examine all of the bids in a unique and novel way to come up with the best combination of a higher "aggregate BPA" and lower "aggregate BYA" that would result in a successful sale. In the event of a sale, this aggregate BPA is the seller's sales proceeds and the aggregate BYA (also called weighted average yield) is the bidder or bidders' respective ownership interest(s) in the cash flow from the real estate asset.

The apparatus and software preferably analyzing all possible outcomes for sellers. These outcomes may be modeled in different ways. For example, a seller may request the exchange to sell 100% of a RE asset for $100,000 at a 10% asking yield. However, seller may further request a condition such as the following: in the event the bidding produces an outcome whereby the seller can retain an ownership interest in RE asset for between $0 and $20,000 or 0% and 20% of the asking price of the RE asset and earn a minimum yield on its remaining REAFS interest of 12%, then seller would then retain such ownership interest in asset.

Alternatively, sellers can choose to sell a certain portion of a RE asset and list or auction such desired saleable portion only. Sellers may also choose to offer multiple asking yields to correspond with minimum bid amounts. Virtually any combination of ask yields, bid amounts and fractions of properties can be manipulated to derive varied outcomes, of which some may be disclosed and some may not, so long as there is no legal conflict with non disclosed conditions.

Throughout the auction or sale, the apparatus and software may automatically create and track aggregated outstanding bid amounts and outstanding current weighted average yield ("WAY"—also referred to as current weighted average coupon ("WAC") or current weighted average cap rate ("WACR")), which may be displayed to bidders if the seller chooses. The WAY software monitors and weighs all of the individual bid yields in connection with the individual bid amounts and provides the seller with an aggregated combined WAY. As an example, suppose bidder A bids $10,000 bid amount with 10% yield, and bidder B bids $12,000 bid amount with 8% yield. The weighted average yield is a way to evaluate the yield that would result from combining the two bids. To do this, the disclosed technology can multiply the bid amount with the bid yield for each bid, sum all of these products together, and divided this sum by the sum of all of the bid amounts. Using the example above, this computation would be: ((10000×0.1)+(12000×0.08))/(10000+12000) =0.89, or 8.9%. Thus, the combination of the two bids would have an aggregate bid amount of $22,000 and a corresponding weighted average yield of 8.9%. This WAY can be displayed to the seller so that the seller can compare it to the seller's asking yield. Another example of this computation is shown in FIG. 9.

Figure 10:
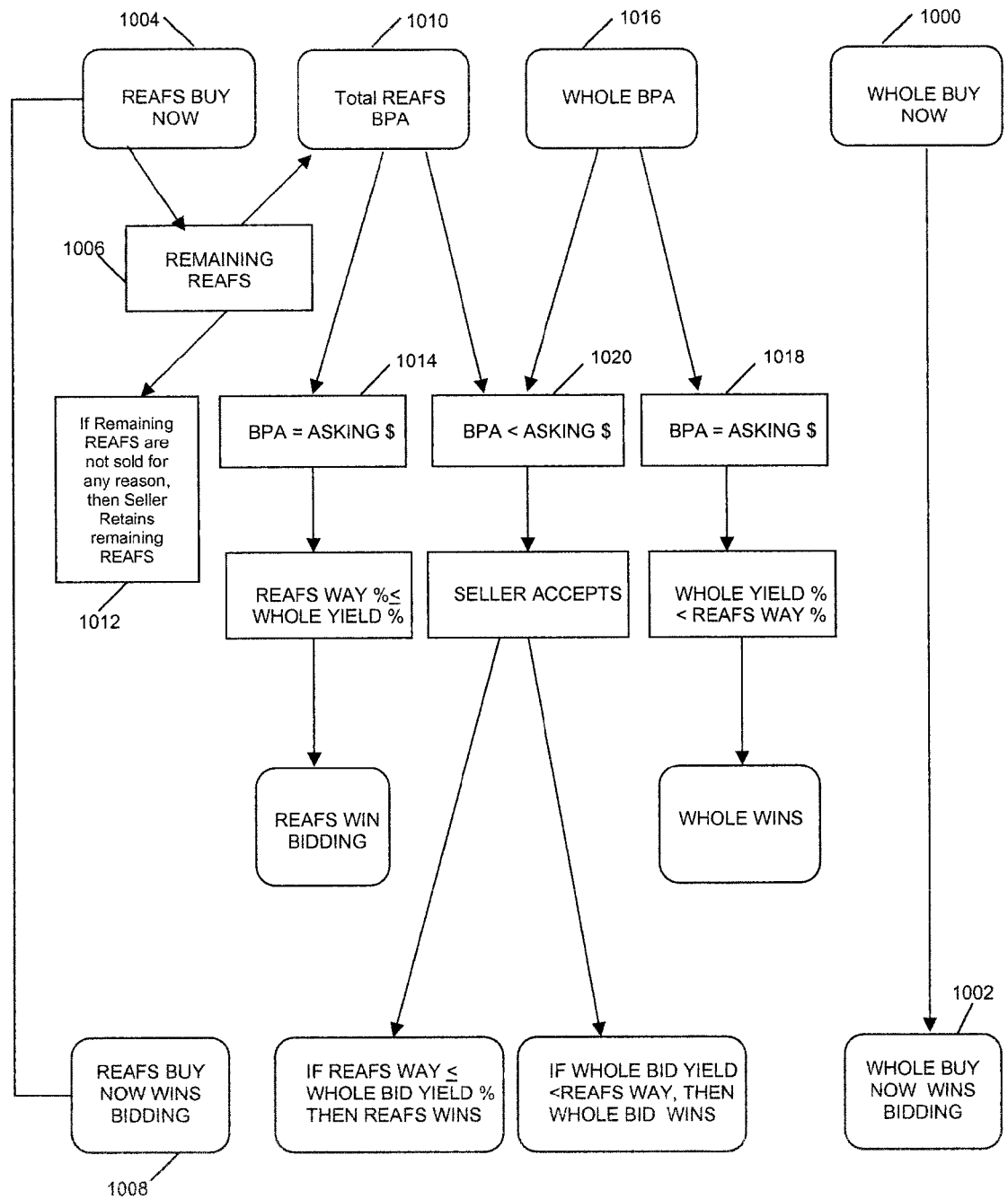
FIG. 10 depicts a flow diagram of exemplary auction operations of the disclosed technology.

Referring now to FIG. 10, there is shown a flow diagram of an exemplary auction operation of the disclosed technology. A seller may elect to make available a whole buy now offer 1000 that, if accepted, will immediately end the auction 1002. The winning bidder is required to purchase the RE asset subject to the terms of the whole buy now offer. The actual ending of the auction may be subject to an acceptable non-refundable or other deposit from seller being held in escrow toward purchase or another payment arrangement acceptable by exchange and/or seller.

Additionally, a seller may elect to make available a REAFS buy now offer 1004 that, if exercised, will reduce the availability of remaining REAFS or interests 1006 in the subject RE asset available for sale throughout the remaining duration of the auction. The winning bidder is required to purchase the REAFS 1008 and the seller is required to sell the REAFS subject to the terms of the REAFS buy now offer. For example, if a RE asset is selling for $100,000 and a bidder bids $10,000 via a buy REAFS now offer, then the bidder's $10,000 REAFS interest would be sold and removed from the auction and the remaining $90,000 would be subject to additional bids during the remainder of the auction. When a REAFS buy now bid is exercised, in the event the remaining interests in the RE asset are not successfully sold either by way of future REAFS bids and/or future REAFS buy now bids during the remainder of the auction 1010, then seller may be required to retain ownership in the unsold portion of the RE asset by converting its remaining unsold ownership interest to a REAFS 1012.

When an asking price has been achieved (typically at the end of the auction, but possibly earlier), sellers preferably are obligated to accept bid amount(s) from bidders that are in line with the asking terms. In at least one embodiment, bids are accepted on a first come first serve basis, subject to lower bid yields taking precedence. When an asking price has been achieved or exceeded, lower yields correspond to higher Future Cash Flow Participation Premium ("FCPP") (described later herein) in connection with capped auctions, or higher seller's yield on remaining interests, or higher sales proceeds (that is, sales price greater than asking price). However, certain derivative and/or option type RE assets may have opposite characteristics, in which case higher bid yields would take precedence. One skilled in the art will recognize in any given situation which bids yields take precedence.

At times, bid amounts can have an influence on a bid's precedence and consideration. For instance, bidders may be able to submit bids based on an "All or Nothing" bid amount, so if a bidder does not get allocated its entire bid amount, its bid may be automatically withdrawn (unless, for example, without such a bid the success of the auction was in jeopardy of closing, in which case the apparatus may choose an "all or nothing" bid over other bids. Thus, an "all or nothing" bid can at times work favorably for bidders and at other times unfavorably.

In the event there are bids with the same bid yield, then larger bid amounts preferably take precedence. Alternatively, bid amounts may be divided among bidders ratably, equally, or based on a preferred bidder status (subject to other conditions which may affect individual bids or seller requirements). If bid amount and bid yield are identical, then the first bid entered may take precedence, or bid amount can be divided among bidders as previously discussed.

In one embodiment, bid amounts can be reduced to a success bid amount. For example, a bidder may bid a $25,000 bid amount at an 11% bid yield, and the apparatus may automatically reduce bidder's bid amount to a $10,000 success bid amount at 11% in efforts to maximize profits for seller. The apparatus may also have the option of notifying bidders what bid yield they would need to bid in order to reactivate their bid, if their bid has been removed from the active bid list or outbid.

While the apparatus may offer many different sales methods and auctioning methods or combinations thereof, preferred auction methodology of at least one embodiment (the "Micro Real Estate Auction," "Real Estate Fractional Securities Auction," or "REAFS Auction") is intended to produce the following outcomes (but the invention is not limited to embodiments producing such outcomes):

I. In order for a seller to receive its full asking price and/or yield (when applicable), then it is likely that either: (a) aggregate bidders' bid amounts 1010 are equal to or greater than the asking price 1014, (b) whole bid offer 1016 equals the asking price 1018, (c) all REAFS are sold via the REAFS buy now 1004 and are equal to the asking price (not shown), (d) part of the REAFS are sold via the REAFS buy now 1004, with the balance of the REAFS 1006 either (i) sold as typical REAFS in an auction environment 1010, and/or (ii) the remaining seller's interest is converted to REAFS retained by seller 1012 (if some or none of the remaining REAFS are successfully sold), together achieving a transaction equal to the asking price; or (e) a whole buy now bid is executed 1000.

Figure 11:
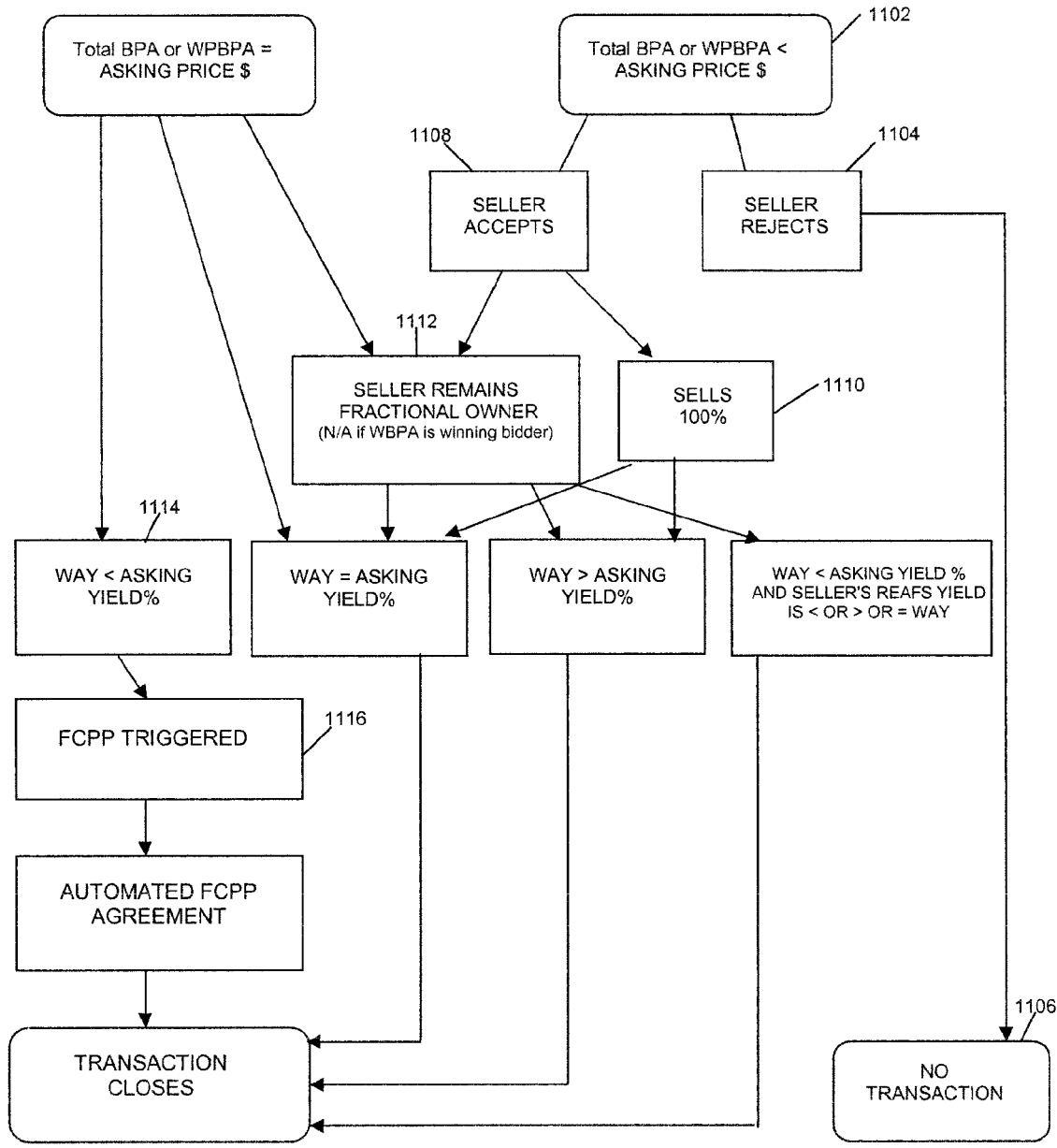
FIG. 11 depicts a flow diagram of other exemplary auction operations of the disclosed technology.

II. Referring also to FIG. 11, if seller were to receive less than its asking price 1102, then it is likely that the WAY or whole bid yield is greater than seller's asking yield (due to the inverse relationship between yields and asking prices). Moreover, the aggregate bidder's bid amounts may be less than the asking price 1102, in which case seller can (i) reject the bid amounts and no transaction occurs 1104-1106, (ii) accept the reduced bid amounts and close the transaction 1108-1110, or (iii) accept all or some of the existing bid amounts in conjunction with converting a portion of its ownership interests into REAFS interests and close the transaction 1112. Alternatively, a whole bid may be the winning bid and be less than the asking price 1102, in which case seller can either reject the sale 1104 or accept the whole bid 1108 and receive a reduced sales price and close the transaction. A second alternative is that part of the REAFS are sold via the REAFS buy now (FIG. 10, 1004), with the balance of the REAFS being sold as typical REAFS in an auction environment (FIG. 10, 1006/1010) and/or remaining as seller's interests converted to REAFS (if some or none of the remaining REAFS are successfully sold), together achieving a transaction where seller receives less than asking price (FIG. 10, 1012).

III. In various embodiments, an auction may be a traditional/uncapped auction in which a real estate asset may sell for more than its asking price. In various embodiments, when a bid amount or aggregate bid amount is greater than the asking price, the seller preferably is obligated to sell the entire ownership in the real estate asset to the bidder or bidders.

IV. Due to the fractional ownership and bidding nature of the Micro Real Estate Auction platform, auctions in one embodiment will be "capped," meaning that asking prices are capped and bidders can only enter bid amounts less than/up to the asking price but not greater than the asking price. Therefore, in such a "capped auction," the asking price will be the maximum price which can be achieved, unlike traditional RE asset sales and auctions in which bid amounts can exceed the asking price. That is, in a capped auction, if a bidder bids $10,000 for a REAFS in connection with a RE asset with a $100,000 asking price then, regardless of bidder's bid yield, bidder is aware of its overall fractional ownership percentage in the RE asset (10% in this example) and in many cases its cost per square foot.

V. In a traditional or "uncapped" auction, bid amounts can exceed the asking price. In an uncapped auction, bidders can still submit bids for fractional ownership by setting the bid amount to be less than the asking price. However, bidders can also submit bids for the entire ownership of a real estate asset by setting the bid amount to be equal to or greater than the asking price. In this case, the bid having the highest bid amount generally wins the auction.

Conventional RE asset sales typically do not have limits on bidding prices, and accordingly the greater the offer or purchase price, the greater the chance of becoming the successful buyer and the more money the seller receives. In one or more embodiments of the disclosed technology, such as in a capped auction, it is not possible for a seller to receive more than the asking price for a RE asset. However, in one embodiment the apparatus and Micro Real Estate Auction methodology provides at least one of two ways for a seller to receive a premium in the event that demand creates a bid yield that would ordinarily increase the asking price. These ways are: (i) participation in the future cash flow of the RE asset (referred to herein as "future cash flow participation premium", or "FCPP"), and (ii) participation in the REAFS ownership structure, with an enhanced or increased yield on its REAFS interest.

With continuing reference to FIG. 11, in the event of a static or fixed sales price auction (typically subject to REAFS only), when the overall bid yield (the WAY) is less than the asking yield 1114, the seller preferably is required to sell the RE asset. Either seller will receive the FCPP 1116 or the system will assist seller in analyzing available ownership retention opportunities and provide corresponding yields connected with such opportunities (FIG. 10, 1012). However, the ownership retention will typically allow for the removal of only bidders with bid yields that are greater than the asking yield and/or WAY.

In the event seller chooses ownership retention, its premium in addition to receiving its asking price on sold REAFS preferably is in the form of additional yield greater than the WAY or asking yield on its equity, which it has converted to a REAFS interest in the subject RE asset. For example, the WAY for the sale might be 10%, but if seller stays in the deal for 20% of sales price, then it may get a 12% yield on its converted equity to REAFS interest, or if it stays in at 10% of the sales price, it may get 11% on its converted equity to REAFS interest (or vice versa).

If a whole bid wins (note that a whole bid generally may exceed an asking price) and the WAY is below the asking yield, then seller would be required to sell and would receive the FCPP and/or a sales price over and above the asking price.

If part of the REAFS are sold via the REAFS buy now, with the balance of the REAFS being sold as typical REAFS in an auction environment and the WAY is below asking yield, then the seller preferably is required to sell the RE asset, as explained above, although the REAFS buy now bids are consummated regardless of their overall yield versus the WAY or asking yield and cannot be removed by seller for retention opportunities.

The Micro Real Estate Auction method is unique in that in at least one embodiment bid amounts are generally static currency amounts (the bid amount can be raised or lowered by the bidder itself or in certain situations the bid amount can be forced lower by the system to the reduced success bid amount). However, the bidding down of the bid yield that corresponds to the bid amount—that is, the bidding down of the yield the bidder is willing to accept in connection with its bid amount on a fractional basis in a specific RE asset—is novel.

Each individual winning bidder (typically with the exception of winning whole bids) will retain a REAFS or fractional security interest in the subject RE asset. Furthermore, each bidder will receive its winning bid yield only on its winning bid amount and/or REAFS. For example, if a winning bidder bids $20,000 at a bid yield of 10%, then its portion due from the subject RE asset's advertised, in place, and/or contemplated contractual cash flow (hereinafter "projected cash flow") (e.g., lease payments, mortgage payments, or option payments) shall be $2,000 per annum payable on a monthly, quarterly, yearly, or other basis. At the conclusion of a successful Micro Real Estate Auction sold to REAFS bidders, there will typically be at least two REAFS owners of the subject RE asset and each individual REAFS's corresponding yield in such RE asset may vary.

REAFS ownership interests in RE assets preferably directly correspond to their bid amounts and/or REAFS amounts divided by the total purchase price plus all applicable closing costs and fees (if any). For example, if bidder A successfully bids $20,000 on a $100,000 RE asset, then its fractional ownership interest will be 20% of the RE asset (regardless of its bid yield on its REAFS or bid amount). The fact that the ownership interest is ratable by the REAFS amount or bid amount, yet the yields can vary on a per REAFS basis on a single asset or pool of assets, is novel and unique.

When the projected cash flow expires and/or terminates (subject to reasonable and equitable provisions), then preferably all REAFS share ratably in the future cash flow in subject RE asset. For example, if bidder A from above acquired its 20% REAFS interest in a property leased to a bank subject to a twenty year lease and two five-year options, then bidder would receive its bid yield for the entire lease period (including option periods or extension periods), and bidder may receive its bid yield plus its pro rata interest in any increased cash flow in connection with the lease (by way of either its pro rata in ownership in property and/or its pro rata interest in original yield). However, at such time that cash flow expires or is terminated ("cash flow termination event"), then going forward all REAFS preferably will share ratably in cash flow and/or disposition proceeds produced by RE asset according to their pro rata ownership interest in the subject RE asset.

As an illustrative example, assume a seller is selling ABC-CBA Store with a 20-year NNN lease paying $100,000 per annum and asking $1,000,000 for the property (a 10% cap or asking yield). If weighted average yield (WAY) is greater than asking yield (say, 10.25%), then the weighted average bid amounts must equal approximately $975,610.00 ($1,000,000/0.1025). If the seller agrees to this price and the REAFS win the bid (but not the whole bid), then there must be 2 or more REAFS in connection with subject property. Furthermore, each REAFS may have a different yield associated with it.

An exchange aspect of the system preferably manages, collects, services and distributes all of the cash flow on a RE asset and divides the cash flow according to the matching yields and bid amounts for each REAFS. One winning bidder could have bid $487,805 at 8% and another could have bid $487,805 at 12.5%. These differing yields are applicable only to the in-place or projected in-place cash flow that the RE asset is intended to generate. When the lease or other obligation expires, or any other substantial interruption of payments occurs (a "cash flow termination event"), then subsequent yields preferably are ratably distributed on a pro rata basis according to the REAFS fractional ownership in the RE asset, and there is no requirement to distribute future cash flow participation premium ("FCPP") funds, if such were applicable prior to the cash flow termination event.

As explained above, typically sellers ask higher amounts for properties than they expect to receive. In at least one embodiment an important aspect is the future cash flow participation premium ("FCPP"), which benefits the seller or the exchange when the auction is a "capped auction" and the auction outcome results in the seller's asking yield being greater than the WAY. In this situation, the seller or the exchange can participate in the future cash flow of the real estate asset by retaining the portion of the contractual cash flow remaining after servicing and distributing the WAY. In this manner, bidding down of bid yield in connection with a fixed bidding amount creates the possibility for the seller or the exchange to participate in the future cash flow of the real estate asset through the FCPP or the high yield earned on its remaining REAFS ownership interest.

The following is one example of the FCPP aspect of the disclosed technology. Assume a seller is selling ABCCBA Store with a 20-year NNN lease paying $10,000 per annum and asking $100,000 for the property (a 10% cap or asking yield). Five bidders win (REAFS 1 is $30,000 @ 10.1%, REAFS 2 is $20,000 @ 9%, REAFS 3 is $10,000@ 11%, REAFS 4 is $15,000 @ 9.5% and REAFS 5 is $25,000 @10.58%) with a WAY of 9.88% ($98,800). Since the asking price in this example is in a capped auction, the full asking price is achieved ($30,000+$20,000+$10,000+$15,000+$25,000=$100,000). However, only $9,880 of the projected $10,000 in cash flow is allocated to the winning bidders' REAFS and their corresponding bid yields. Therefore, the bidders are entitled to only $9,880 of the $10,000 in-place cash flow, leaving a remaining $120 to go towards the FCPP and distributed as an annuity or present value lump sum to the seller or to the exchange, over and above the full asking sales price proceeds.

The results of the auction may be released in a few seconds, although more time may be required if, for example, (i) a whole bidder wins versus the REAFS, in which case the entire proceeds may not have been deposited up front and therefore disclosing the winner could prevent the seller from accepting the REAFS offer in lieu of the whole bidder, or (ii) seller needs time to consider the offer versus remaining in the ownership structure as a REAFS.

In at least one embodiment, closing may takes place within forty-eight hours by having bidders pre-execute applicable document(s) including, but not limited to, the automated Operating Agreement and automated Master Manager Servicer and Custodian Agreement (collectively "closing documents") by E-SIGNING or electronically signing or executing and forwarding via email, fax or mail, at such time that an auction is concluded.

In at least one embodiment, the exchange system provides direct loans to owners of REAFS ("X Loan") and holds them for profit or resells them to bidders. The REAFS at times may be structured with underlying debt or mortgage debt secured by the RE asset. Other times there may be no underlying debt or mortgages securing the RE assets. In either case, exchange-direct loans or bidder loans may be offered to qualified owners and qualified REAFS by assigning, pledging, securing, encumbering, and/or mortgaging.

In at least one embodiment, the exchange system provides options to owners of REAFS ("X Options") and holds them for profit and/or sells them to bidders. In either case, X options may be offered to qualified owners and qualified REAFS by assigning, pledging, securing, encumbering, and/or mortgaging.

Closing costs associated with the sales can be paid for by (i) seller, (ii) bidder, (iii) exchange or (iv) any combination thereof subject to disclosures which will describe the anticipated closing costs and who is responsible for them. The system may display a bidder's anticipated yield after accounting for MMSC Fee, bidder fee, commissions, and/or other applicable closing costs, to the extent it is the bidder's responsibility to cover part or all of the closing costs.

Figure 12:
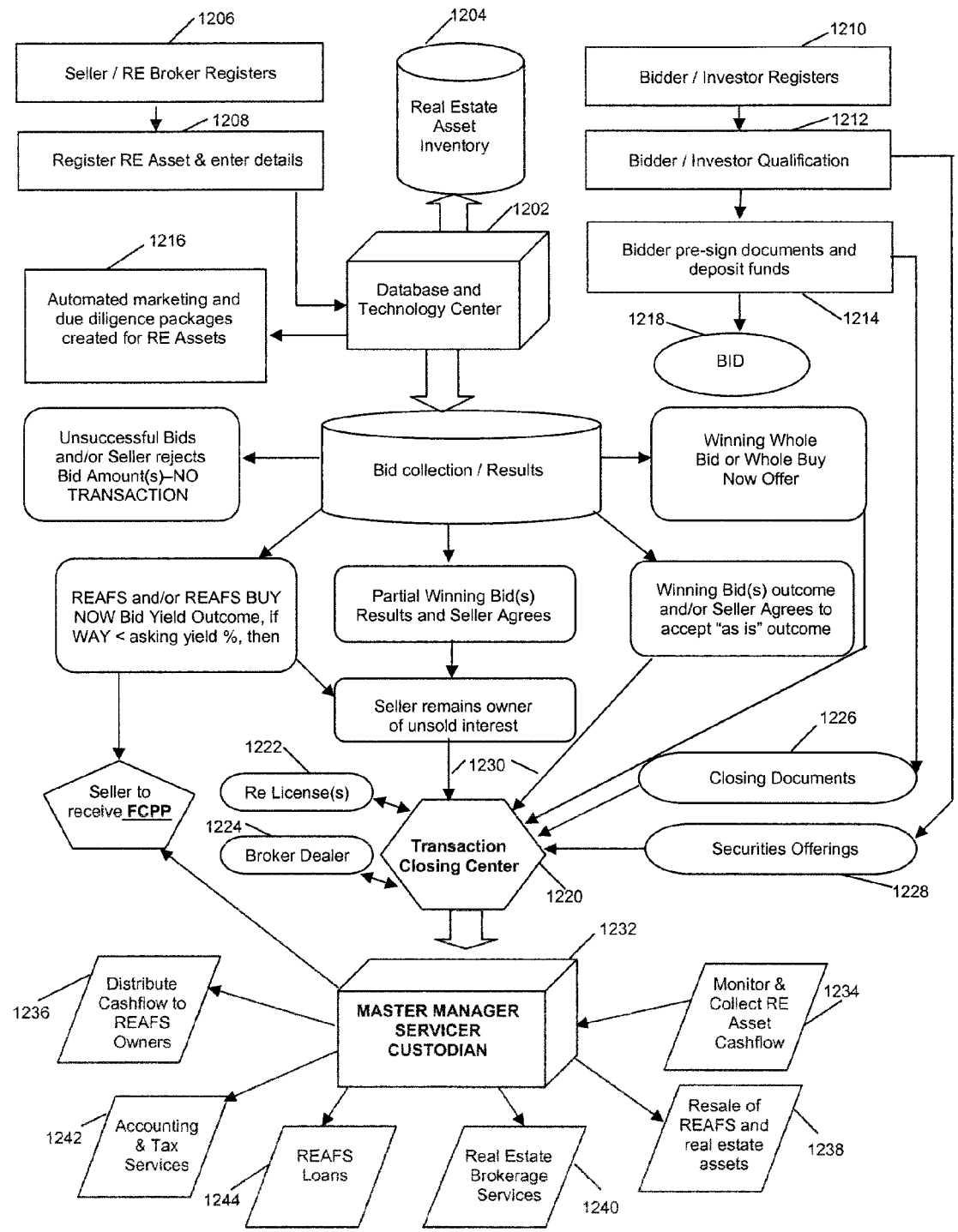
FIG. 12 is a block diagram of exemplary components of an exchange system in accordance with the disclosed technology.

To summarize the foregoing, and with reference to FIG. 12, the disclosed technology addresses a void in the marketplace by providing an online market and exchange that combines one or more of: (i) RE asset transactions; (ii) creation and selling of REAFS or REAMS and whole RE assets; (iii) unique and/or conventional auctioning systems; (iv) the use of realtor licenses (if applicable); (v) the use of a registered broker dealer (if applicable); (vi) a unique ownership structure that enable overseas investors to acquire REAFS or whole RE assets (or one or more mechanisms that will perform similarly to direct ownership in REAFS); (vii) specific ownership structure(s) for REAFS and/or REAMS including undivided and divided interests in tenancy in common and/or other methods of ownership); (viii) a unique operating agreement execution process to be completed via ESIGN or customary execution prior to bidding; (ix) an automated and unique future cash flow participation premium agreement (the "FCPP agreement"), when applicable; (x) securities offerings including interstate private placements, intrastate private placements, public offerings and global offerings; (xi) a Master Manager Servicer and Custodian ("MMSC") agreement (which may be part of an operating agreement or a separate document); and (xii) an online web based interface.

An exchange system in accordance with the disclosed technology can include a database and technology center 1202 in communication with a real estate asset inventory 1204. Sellers and real estate brokers can register with the exchange system 1206 and can register real estate assets and their details 1208, and this information can be stored in the database and technology center 1202. Bidders/investors can also register with the exchange system 1210 and may undergo a bidder/investor qualification process 1212. Once qualified, bidders can pre-sign various documents and deposit funds into their account with the exchange system 1214. Bidder information can be stored in the database and technology center 1202. Based on the real estate asset information stored in the database 1202, the exchange system can generate marketing and due diligence packages 1216. Bidders can review this information and if they wish to enter a bid for a real estate asset or REAFS for the asset, the bidder's bids 1218 can also be stored in the database and technology center 1202. The exchange system can collect bid information from bidders and process them in accordance with the operations described in FIG. 10 and FIG. 11.

With continuing reference to FIG. 12, the exchange system can include a transaction closing center 1220 that can manage, among other things, real estate licenses 1222, broker dealer licenses 1224, closing documents 1226, securities offerings 1228, and auction operations that result in a transaction closing 1230. The exchange system can also include a master manager servicer custodian 1232 that can perform various operations, including monitor and collect real estate asset cash flows 1234, distribute cash flow to REAFS owners 1236, resell REAFS and real estate assets 1238, provide real estate brokerage services 1240, provide accounting and tax services 1242, provide REAFS loans 1244, and provide whole loans.

What have been described above are systems and methods for processing and managing fractional interests in real estate assets. Various embodiments have been described above, and many embodiments are described below. The embodiments should not be construed to be mutually exclusive, and it is contemplated that various embodiments can operate together.

One aspect of the disclosed technology includes a computer executing software for processing, auctioning, and managing fractional ownership in real estate assets, wherein the software, when executed, causes the computer to perform various steps. The software causes the computer to access electronic information specifying a real estate asset for sale, wherein the electronic information specifies that ownership of the real estate asset includes a right to at least a portion of income from the real estate asset. The software causes the computer to access electronic information specifying one or more bids for fractional ownership in the real estate asset, wherein each of the bids specifies a bid amount to be paid for the fractional ownership and a bid yield corresponding to the bid amount. The software causes the computer to select at least one bid for a sale transaction for the real estate asset, and stores an electronic record indicating sale of a fractional ownership in the real estate asset based on the one or more selected bid(s).

In one embodiment, the electronic information specifying the real estate asset for sale further specifies a buy now option. The one or more bids include a bid exercising the buy now option, and the sales transaction is formed using the bid exercising the buy now option. In one embodiment, the buy now option includes an option to buy a fractional ownership in the real estate asset now, and/or an option to buy an entire ownership in the real estate asset now.

In one embodiment, the software causes the computer to group the one or more bids into one or more combinations of bids. For each combination, the computer computes a weighted average yield for the combination based on bid amounts and bid yields for bids in the combination, and computes an aggregate bid amount for bids in the combination. The computer selects one combination from the one or more of combinations based on the computed weighted average yields and the aggregate bid amounts.

In one embodiment, the selection of one combination from the one or more combinations is further based on one or more preferences specified by a seller of the real estate asset. In one embodiment, a seller preference includes the seller retaining a particular fractional ownership in the RE asset, or in other words, the seller selling less than 100% of the RE asset.

In one embodiment, the software causes the computer to select the combination that has a lower product of aggregate bid amount and weighted average yield compared to corresponding products for other combinations.

In one embodiment, the combinations include a first combination having a first aggregate bid amount and a first weighted average yield, and a second combination having a single bid for an entire ownership in said real estate asset, wherein said first aggregate bid amount is equal to a bid amount in said single bid. The software causes the computer to select the first combination when said first weighted average yield is less than a bid yield in the single bid, and to select the second combination when said first weighted average yield is greater than or equal to the bid yield in the single bid.

In one aspect, the disclosed technology includes a computer implemented method for processing, auctioning, and managing fractional ownership in real estate assets. The computer implemented method includes accessing, by a computer, electronic information specifying a real estate asset for sale, wherein the electronic information specifies that ownership of the real estate asset includes a right to at least a portion of the income from the real estate asset. The computer implemented method includes accessing, by the computer, electronic information specifying one or more bids for fractional ownership in said real estate asset, wherein each of the bids specifies a bid amount reflecting a purchase price to be paid for the fractional ownership and a corresponding bid yield associated with the bid amount. The computer implemented method includes selecting, by the computer, at least one bid from the one or more bids for a sale transaction for the real estate asset, and storing, by the computer, an electronic record indicating sale of a fractional ownership in the real estate asset based on the selected bid(s).

In one embodiment, the electronic information specifying the real estate asset for sale further specifies a buy now option. The one or more bids include a bid exercising the buy now option, and the sales transaction is formed using the bid exercising the buy now option. In one embodiment, the buy now option includes an option to buy a fractional ownership in the real estate asset now, and/or an option to buy an entire ownership in the real estate asset now.

In one embodiment, the computer implemented method includes grouping, by the computer, the one or more bids into combinations of bids. For each combination, the computer implemented method computes a weighted average yield for the combination based on bid amounts and bid yields for bids in the combination, and computes an aggregate bid amount for bids in said combination. The computer implemented method selects one combination from the one or more combinations based on the weighted average yields and the aggregate bid amounts.

In one embodiment, the selection of one combination from the one or more combinations is further based on one or more preferences specified by a seller of the real estate asset. In one embodiment, a seller preference includes the seller retaining a particular fractional ownership in the RE asset, or in other words, the seller selling less than 100% of the RE asset.

In one embodiment, the computer implemented method includes selecting, by the computer, the combination that has a lower product of aggregate bid amount and weighted average yield compared to corresponding products for other combinations.

In one embodiment, the combinations include a first combination having a first aggregate bid amount and a first weighted average yield, and a second combination having a single bid for an entire ownership in said real estate asset, wherein said first aggregate bid amount is equal to a bid amount in said single bid. The computer implemented method includes selecting, by the computer, the first combination when said first weighted average yield is less than a bid yield in the single bid, and to select the second combination when said first weighted average yield is greater than or equal to the bid yield in the single bid.

Embodiments of the present invention comprise software and computer components and software and computer-implemented steps that will be apparent to those skilled in the art. For ease of exposition, not every step or element of the present invention is described herein as part of software or computer system, but those skilled in the art will recognize that each step or element may have a corresponding computer system or software component. Such computer system and/or software components are therefore enabled by describing their corresponding steps or elements (that is, their functionality), and are within the scope of the present invention.

It will be appreciated that the present invention has been described by way of example, and that the invention is not to be limited by the specific embodiments described herein. Improvements and/or modifications may be made to the invention without departing from the scope or spirit thereof.

What is claimed is:

1. A computer executing software for processing, auctioning, and managing fractional ownership in real estate assets, wherein the software, when executed, causes the computer to perform steps comprising:
    accessing electronic information specifying a real estate asset for sale, wherein said electronic information specifies that ownership of said real estate asset includes a right to at least a portion of income from said real estate asset;
    accessing electronic information specifying a plurality of fractional ownership bids in said real estate asset, wherein each of said fractional ownership bids specifies a bid amount to be paid for fractional ownership in said real estate asset and a corresponding bid yield associated with said bid amount;
    selecting a first bid from said plurality of fractional ownership bids for a sale transaction transferring a first fractional ownership in said real estate asset, said first fractional ownership being specified in said first selected bid and comprising less than 100% of ownership of said real estate asset, said first selected bid also specifying a first bid yield that corresponds to a first portion of future income from said real estate to be paid over a specified time period to a bidder making said first selected bid, said selecting being based on both the bid amount and the bid yield of said first selected bid;
    selecting a second bid from said plurality of fractional ownership bids for a sale transaction transferring a second fractional ownership in said real estate asset, said second fractional ownership being specified in said second selected bid and comprising less than 100% of ownership of said real estate asset, said second selected bid also specifying a second bid yield that corresponds to a second portion of future income from said real estate to be paid over said specified time period to a bidder making said second selected bid, said selecting being based on both the bid amount and the bid yield of said second selected bid; and
    storing an electronic record indicating sale of a first fractional ownership in said real estate asset to said bidder making said first selected bid and an electronic record indicating sale of a second fractional ownership in said real estate asset to said bidder making said second selected bid.

2. A computer executing software as in claim 1, wherein:
    said electronic information specifying said real estate asset for sale further specifies a buy now option;
    said plurality of fractional ownership bids includes a bid exercising said buy now option; and
    said selecting a first bid from said plurality of fractional ownership bids comprises selecting said bid exercising said buy now option.

3. A computer executing software as in claim 2, wherein said buy now option includes at least one of: an option to buy a fractional ownership in said real estate asset now, and an option to buy an entire ownership in said real estate asset now.

4. A computer executing software as in claim 1, wherein selecting selecting a first bid from said plurality of fractional ownership bids comprises:
    grouping said plurality of fractional ownership bids into a plurality of combinations of bids;
    for each combination:
    computing a weighted average yield for said combination based on bid amounts and bid yields for bids in said combination,
    computing an aggregate bid amount for bids in said combination; and
    selecting one combination from said plurality of combinations based on said weighted average yields and said aggregate bid amounts.

5. A computer executing software as in claim 4, wherein selecting one combination from said plurality of combinations is further based on at least one preference specified by a seller of said real estate asset.

6. A computer executing software as in claim 5, wherein said at least one preference specified by said seller comprises said seller retaining a particular fractional ownership in said real estate asset.

7. A computer executing software as in claim 4, wherein selecting one combination from said plurality of combinations comprises selecting a combination that has a lower product of aggregate bid amount and weighted average yield compared to corresponding products for other combinations.

8. A computer executing software as in claim 4, wherein said plurality of combinations includes: a first combination having a first aggregate bid amount and a first weighted average yield, and a second combination having a single bid for an entire ownership in said real estate asset, wherein said first aggregate bid amount is equal to a bid amount in said single bid, and wherein selecting one combination from said plurality of combinations comprises:
    selecting said first combination when said first weighted average yield is less than a bid yield in said single bid; and
    selecting said second combination when said first weighted average yield is greater than or equal to said bid yield in said single bid.

9. A computer implemented method for processing, auctioning, and managing fractional ownership in real estate assets, the method comprising:
    accessing, by a computer, electronic information specifying a real estate asset for sale,
    wherein said electronic information specifies that ownership of said real estate asset includes a right to at least a portion of income from said real estate asset;
    accessing, by said computer, electronic information specifying a plurality of fractional ownership bids in said real estate asset, wherein each of said fractional ownership bids specifies a bid amount to be paid for fractional ownership in said real estate asset and a corresponding bid yield associated with said bid amount;
    selecting, by said computer, a first bid from said plurality of fractional ownership bids for a sale transaction transferring a first fractional ownership in for said real estate asset, said first fractional ownership being specified in said first selected bid and comprising less than 100% of ownership of said real estate asset, said first selected bid also specifying a first bid yield that corresponds to a first portion of future income from said real estate to be paid over a specified time period to a bidder making said first selected bid, said selecting being based on both the bid amount and the bid yield of said first selected bid;
    selecting, by said computer, a second bid from said plurality of fractional ownership bids for a sale transaction transferring a second fractional ownership in said real estate asset, said second fractional ownership being specified in said second selected bid and comprising less than 100% of ownership of said real estate asset, said second selected bid also specifying a second bid yield that corresponds to a second portion of future income from said real estate to be paid over said specified time period to a bidder making said second selected bid, said selecting being based on both the bid amount and the bid yield of said second selected bid; and storing, by said computer, an electronic record indicating sale of a first fractional ownership in said real estate asset to said bidder making said first selected bid and an electronic record indicating sale of a second fractional ownership in said real estate asset to said bidder making said second selected bid.

10. A computer implemented method as in claim 9, wherein:

said electronic information specifying said real estate asset for sale further specifies a buy now option;

said plurality of fractional ownership bids includes a bid exercising said buy now option; and said selecting a first bid from said plurality of fractional ownership bids comprises selecting said bid exercising said buy now option.

11. A computer implemented method as in claim 10, wherein said buy now option includes at least one of: an option to buy a fractional ownership in said real estate asset now, and an option to buy an entire ownership in said real estate asset now.

12. A computer implemented method as in claim 9, wherein selecting a first bid from said plurality of fractional ownership bids comprises:

grouping said plurality of fractional ownership bids into a plurality of combinations of bids;

for each combination:

computing a weighted average yield for said combination based on bid amounts and bid yields for bids in said combination, computing an aggregate bid amount for bids in said combination; and selecting one combination from said plurality of combinations based on said weighted average yields and said aggregate bid amounts.

13. A computer implemented method as in claim 12, wherein selecting one combination from said plurality of combinations is further based on at least one preference specified by a seller of said real estate asset.

14. A computer implemented method as in claim 13, wherein said at least one preference specified by said seller comprises said seller retaining a particular fractional ownership in said real estate asset.

15. A computer implemented method as in claim 12, wherein selecting one combination from said plurality of combinations comprises selecting a combination that has a lower product of aggregate bid amount and weighted average yield compared to corresponding products for other combinations.

16. A computer implemented method as in claim 12, wherein said plurality of combinations includes: a first combination having a first aggregate bid amount and a first weighted average yield, and a second combination having a single bid for an entire ownership in said real estate asset, wherein said first aggregate bid amount is equal to a bid amount in said single bid, and wherein selecting one combination from said plurality of combinations comprises:

selecting, by said computer, said first combination when said first weighted average yield is less than a bid yield in said single bid; and selecting, by said computer, said second combination when said first weighted average yield is greater than or equal to said bid yield in said single bid.

* * * * *